United States Patent [19]
Ruoss et al.

[11] Patent Number: 5,353,186
[45] Date of Patent: Oct. 4, 1994

[54] REACTOR SWITCH

[76] Inventors: Erich Ruoss, Bündtenstr. 25, 5417 Untersiggenthal; Georg Schett, Stockenerstr. 64, 8405 Winterthur, both of Switzerland

[21] Appl. No.: 30,575

[22] Filed: Mar. 12, 1993

[30] Foreign Application Priority Data

Mar. 13, 1992 [DE] Fed. Rep. of Germany ....... 4207983

[51] Int. Cl.⁵ .............................................. H01H 33/16
[52] U.S. Cl. ...................................... 361/117; 361/91; 361/111; 200/144 AP
[58] Field of Search ................. 361/13, 117, 111, 127, 361/58, 11; 200/144 AP

[56] References Cited

U.S. PATENT DOCUMENTS

| | | | |
|---|---|---|---|
| 4,263,490 | 4/1981 | Pham Van | 200/144 |
| 4,831,487 | 5/1989 | Ruoss et al. | 361/111 |
| 5,170,023 | 12/1992 | Pham et al. | 200/144 AP |

FOREIGN PATENT DOCUMENTS

| | | |
|---|---|---|
| 1052500 | 3/1957 | Fed. Rep. of Germany . |
| 1267307 | 2/1967 | Fed. Rep. of Germany . |
| 3444317 | 5/1986 | Fed. Rep. of Germany . |

*Primary Examiner*—A. D. Pellinen
*Assistant Examiner*—Sally Medley

[57] ABSTRACT

The reactor switch is provided for switching on and off a reactor (2) in a multiphase electrical high-voltage network. It has switch poles (3) which are arranged phase-by-phase between the reactor (2) and a part of the network containing, a high-voltage line (1). These switch poles (3) in each case contain at least two series-connected switching chambers (11, 12; 13, 14) in parallel with which at least two series-connected varistors (15, 16; 18, 19) are connected. This reactor switch is intended to be capable of disconnecting short-circuits occurring between the reactor switch and the reactor (2) without problems. This is achieved in that the at least two varistors (15, 16, 17, 18, 19) and the at least two switching chambers (11, 12; 13, 14) are connected together in the form of a network on which the high-voltage network acts in terms of current and voltage and in which, in the event of restriking of some (11, 12) of the at least two switching chambers, the energy which is supplied to those varistors (17, 18, 19) which are connected in parallel with the switching chambers (13, 14) which are free of restrikes is less than in the case of a reactor switch having a network which is acted on in a corresponding manner, but in which each of the at least two switching chambers is bridged by at least one of the at least two varistors.

10 Claims, 3 Drawing Sheets

REACTOR SWITCH

BACKGROUND OF THE INVENTION

1. Field of the Invention

The invention relates to a reactor switch for switching on and off a reactor which is arranged in a multiphase electrical high-voltage network and in which switch poles are provided phase-by-phase between the reactor and a part of the network, for example a high-voltage line, which switch poles in each case have at least two series-connected switching chambers in parallel with which at least two series-connected varistors are connected.

2. Discussion of Background

A reactor switch of the type mentioned is disclosed, for example, in US-A-4,831,487. In this reactor switch, metal oxide varistors are connected across the series-connected switching cheers of a switch pole. This results in the recovery voltage which occurs after a quenching process when disconnecting a reactor in a high-voltage network rising only to a specific value. In the case of a restrike which possibly occurs in the case of small contact distances, the gradient of a high-frequency restrike transient can then be limited to a predetermined extent, and the insulation of the reactor can thus be protected against unacceptably high dielectric loads.

It is possible for the restrike not to occur in all the series-connected switching chambers of the switch pole, but only in some of these switching chambers. The restrike current then flows via the restruck switching chambers to those varistors which are connected in parallel with the switching chambers which are free of restrikes and, in general, also via the reactor. Fundamentally, there is no need in this case to be concerned about overloading of the current-carrying varistors in terms of energy, since the reactor limits the restrike current. However, it is also possible for a short-circuit to occur between the reactor switch and the reactor, and for the restrike current no longer to be limited by the reactor. In such a case, overloading, in terms of energy, of the varistors carrying the restrike current possibly cannot be prevented.

SUMMARY OF THE INVENTION

Accordingly, one object of the invention is to provide a novel reactor switch of the type mentioned by means of which short-circuits occurring between the switch and the reactor can be disconnected without problems.

The reactor switch according to the invention is of comparatively simple construction and, in particular, also copes with the disconnection of a short-circuit occurring between the switch and the reactor. This results from the fact that the varistors and switching chambers are connected together in the form of a network on- which the high-voltage network acts in terms of current and voltage and in which, in the event of restriking of some of the switching chambers, the energy which is supplied to those varistors which are connected in parallel with the switching chambers which are free of restrikes is less than in the case of a reactor switch having a network which is acted on in a corresponding manner, but in which each of the switching chambers is bridged by one of the varistors.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
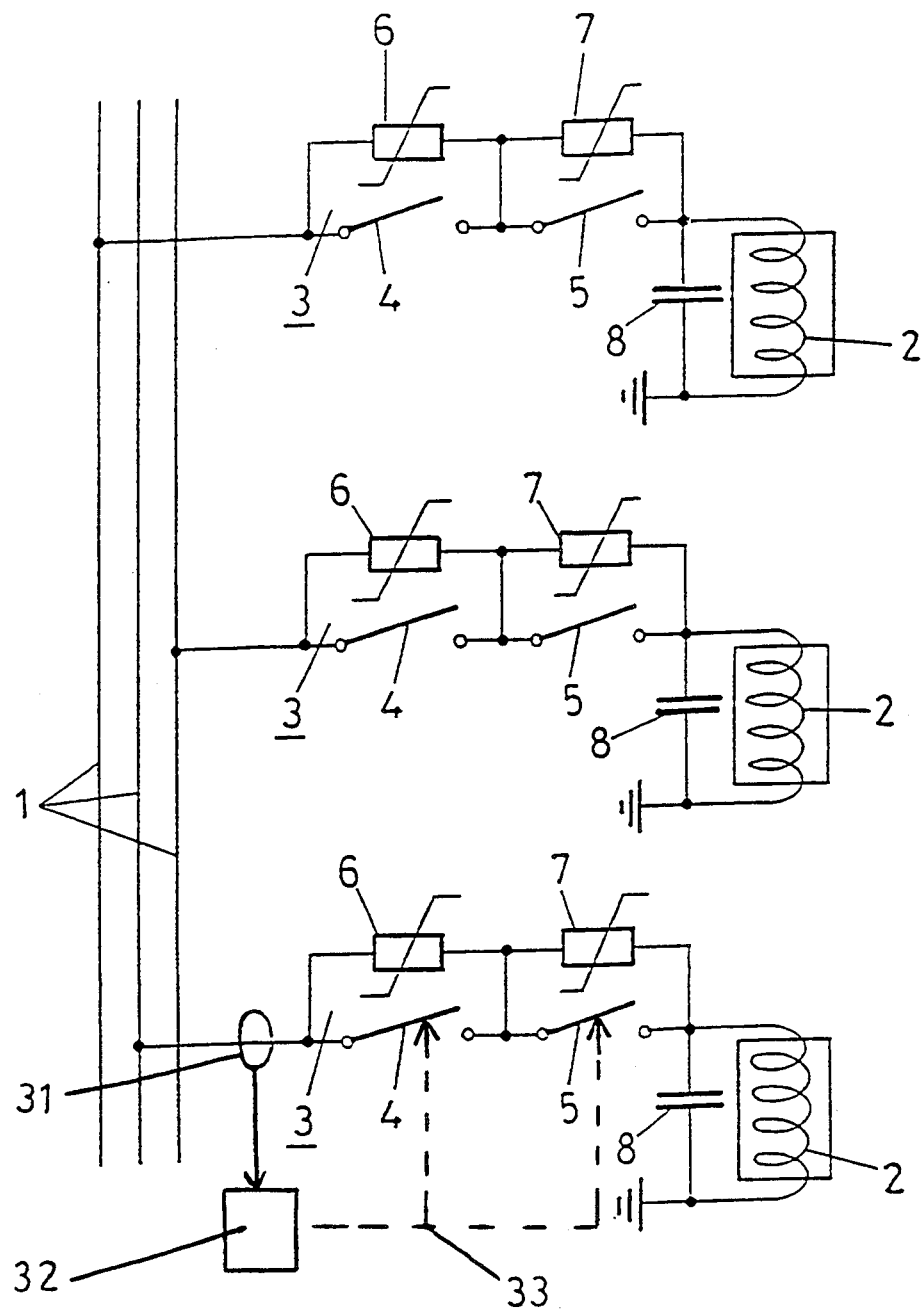
FIG. 1 shows a circuit diagram of a three-phase high-voltage network having a reactor switch constructed according to the prior art.

Referring now to the drawings, wherein like reference numerals designate identical or corresponding parts throughout the several views, the high-voltage network shown in FIG. 1 contains a three-phase high-voltage line 1 and a three-phase reactor 2 whose mutually corresponding phases can in each case be connected to one another or separated from one another via switch poles 3 of a reactor switch. The switch poles 3 are in each case of identical construction and in each case contain two, possibly, however, even more, series-connected switching chambers 4, 5. In each case one voltage-limiting element, preferably constructed as a varistor 6, 7, is in each case connected in parallel with each of the two switching chambers 4, 5. Each varistor contains varistor disks which are arranged in stacks in the form of columns and composed of metal oxides, which preferably contain predominantly zinc oxide. Another capacitor 8, which is essentially provided by the intrinsic capacitance of the individual phases of the reactor 2, is shown in parallel with the individual phases of the reactor 2.

When the reactor switch is switched off, the recovery voltage after quenching of the arc rises only to a specific value, because of the varistors 6, 7 which are located across the switching chambers 4, 5. In the event of a restrike, which possibly occurs in the case of small contact distances, the gradient of a radio-frequency restrike transient can then be limited to a predetermined extent, and the insulation of the reactor 2 can thus be protected against unacceptably high dielectric loads.

If the restrike does not occur in all the series-connected switching chambers 4, 5, of the switch pole 3, for example, only in the switching chamber 4, then the restrike current flows via the restruck switching chamber 4, the varistor 7 and, normally, also via the reactor 2. There is no need in this case to be concerned about overloading of the current-carrying varistor 7 in terms of energy, inasfar as the reactor 2 limits the restrike current. On the other hand, if a short-circuit occurs between the reactor switch and the reactor 2, then the restrike current is now no longer limited by the reactor 2. In such a case, overloading, in terms of energy, of the varistor carrying the restrike current cannot be precluded.

In FIG. 1, a current transformer 31, a processing unit 32 and an operating device 33 are provided to control the reactor switch 3.

Figure 2:
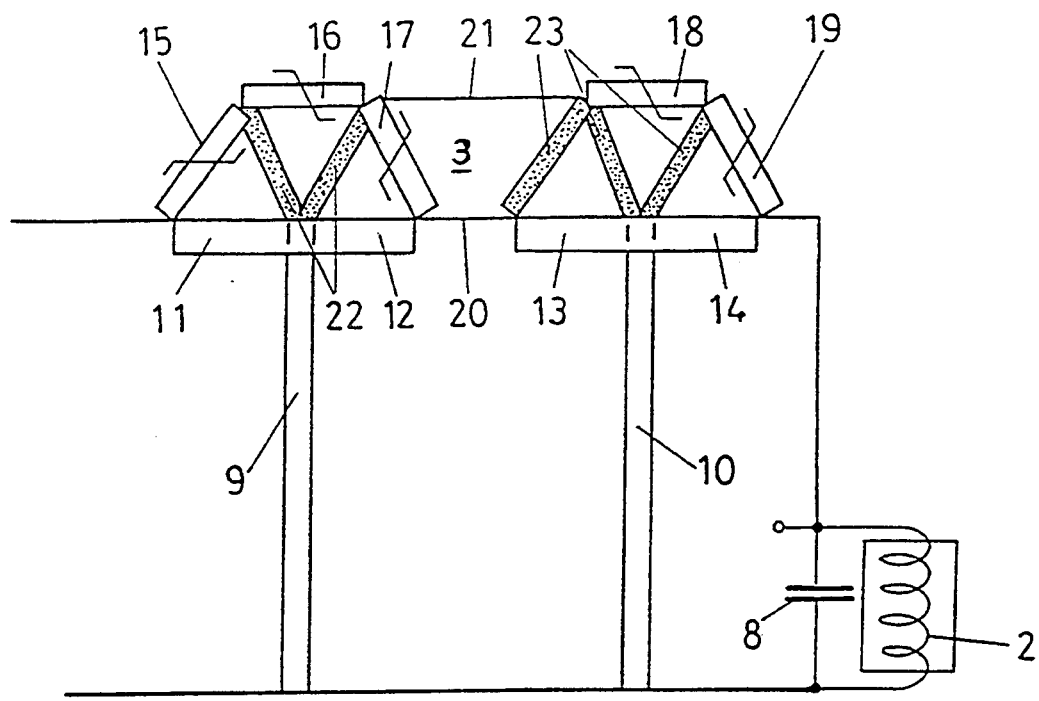
FIG. 2 shows a schematic view of a switch pole of a first embodiment of the reactor switch according to the invention, which reactor switch is arranged in the high-voltage network according to FIG. 1 instead of the reactor switch according to the prior art.

The switch pole 3, shown in FIG. 2, of a reactor switch according to the invention has two insulator columns 9, 10. Two series-connected first switching chambers 11, 12 are mounted on the insulator column 9, and two series-connected second switching chambers 13, 14 are mounted on the insulator column 10. The series connection of the two first switching chambers 11, 12 is bridged by series-connected first varistors 15, 16 and a third varistor 17. The series connection of the two second switching chambers 13, 14 is bridged by series-connected second varistors 18, 19 and the third varistor 17. In this case, the third varistor 17 is connected at its one end to a current connection 20 between the first 11, 12 and the second switching chambers 13, 14, and at its other end to a current connection 21 between the first 15, 16 and the second varistors 18, 19. The varistors 15, 16, 17, 18 and 19 are supported by means of some of their electrical connections on auxiliary insulators 22, 23 which are arranged in a V-shape or N-shape and are mounted on the two insulator columns.

The first 11, 12 and second switching chambers 13, 14, the first 15, 16 and second varistors 18, 19, and the third varistor 17 form a network which is arranged in the form of a bridge. The four bridge arms are formed successively by the first switching chambers 11, 12, the second switching chambers 13, 14, the first varistors 15, 16 and the second varistors 18, 19. The third varistor 17 is arranged in the bridge diagonal. The varistors 15 to 19 have virtually identical current/voltage characteristics, a virtually identical residual voltage, and a virtually identical energy absorption capability. The first 15, 16 and second varistors 18, 19 are additionally dimensioned in such a manner that, in the event of a restrike of the two first 11, 12 and of the two second switching chambers 13, 14, the gradient of the restrike transients is constrained by limiting the recovery voltage to a value which is compatible with the electrical insulation of the reactor 2.

The switch pole shown in FIG. 2 acts as follows: if all four switching chambers 11 to 14 have restruck when the reactor 2 is switched off, then the four series-connected varistors 15, 16, 18 and 19 limit the recovery voltage and hence constrain the gradient of the restrike transients to a value which is compatible with the insulation of the reactor 2. In this case, the varistors consume virtually no energy.

In contrast, if only some of the switching chambers, for example the two first switching chambers 11, 12 have restruck when the reactor 2 is switched off, then the restrike current flows from the high-voltage line 1 via the two restruck first switching chambers 11, 12, the third varistor 17, the current connection 21 and the second varistors 18, 19, normally, into the reactor 2. This current is limited by the reactor 2 in such a manner that the three current-carrying second varistors 17, 18, 19 do not need to consume a particularly large amount of energy. If a short-circuit occurs between the reactor switch and the reactor 2, the total network voltage is, in contrast, dropped across the three varistors 17, 18 and 19. In contrast to a reactor switch according to the prior art, these three varistors can carry the current caused by the network voltage without in this case consuming excessive energy. This is explained using the family of characteristics according to FIG. 3.

Figure 3:
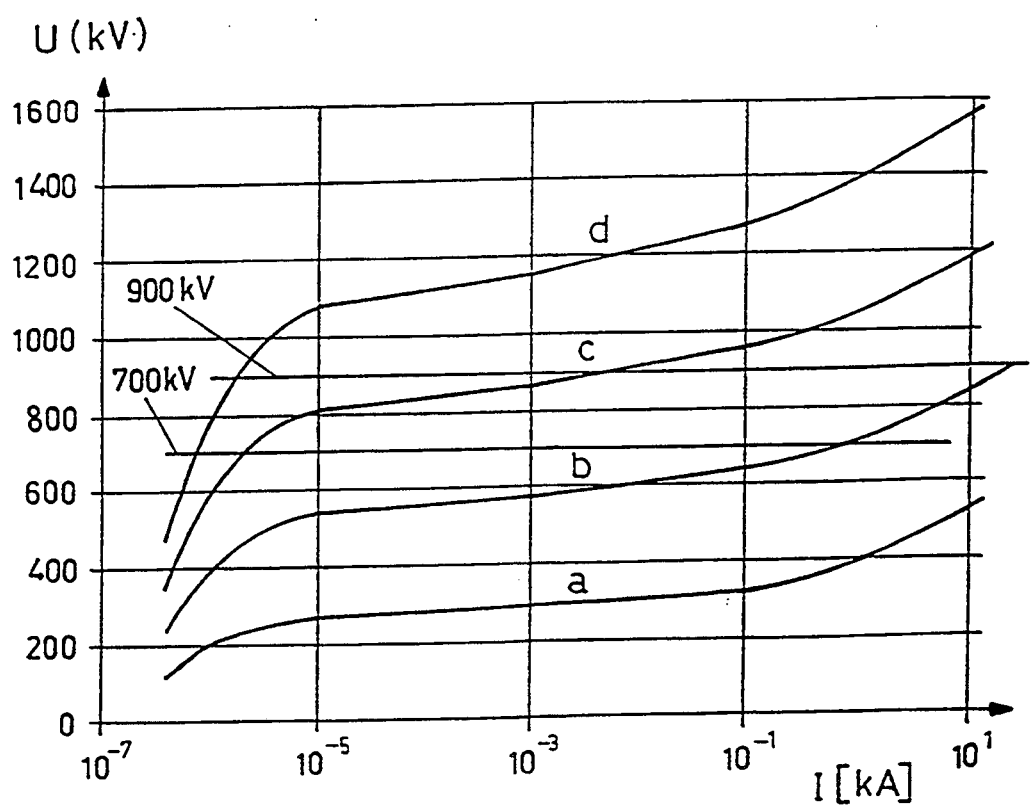
FIG. 3 shows a family of characteristics of a varistor and of a plurality of series-connected varistors of the reactor switch according to FIG. 2.

In FIG. 3, U designates a voltage which is applied to four varistor arrangements having current/voltage characteristics a, b, c and d, and I designates a current flowing through these arrangements. The four varistor arrangements having the characteristics a, b, c and d contain successively, connected in series, one, two, three or four varistors of identical construction. When used in high-voltage networks up to 800 kV, such a varistor typically consumes 1 MJ of energy. In the case of high-voltage networks up to 800 kV, four series-connected varistors are expediently used, as is shown by the varistors 15, 16, 18 and 19 in the case of the switch pole according to FIG. 2. These four varistors 15, 16, 18 and 19 can typically consume 4 MJ of energy. A varistor arrangement which contains the four series-connected varistors has the characteristic d indicated in FIG. 3. A varistor arrangement containing only the three varistors 17, 18 and 19, or the two varistors 18 and 19, has the characteristics c or b respectively indicated in FIG. 3.

When disconnecting the reactor 2, without restriking, in a high-voltage network with a rated voltage of, for example, 800 kV, there is a voltage with a peak value of approximately 700 kV on the four varistors 15, 16, 18 and 19. The characteristic d shows that this voltage causes a current in the varistor arrangement in the $\mu$A—to mA—range. This current heats the varistors only in a manner which is permissible for continuous operation.

When disconnecting a short-circuit occurring between the reactor switch and the reactor 2, a voltage having a peak value up to 900 kV may be present on the three varistors 17, 18 and 19 in the event of the two first switching chambers 11, 12 restriking. The characteristic c shows that this voltage causes a greater current, in the ampere range, and hence more heating than in the case of disconnection without restriking. However, this heating can be absorbed without problems by the varistor arrangement associated with the characteristic c.

In contrast, in the case of the switch according to the prior art, there are only two varistors in the path of the short-circuit current in the event of the two switching chambers 11 and 12 restriking. The characteristic b shows that the network voltage in this case results in a varistor current in the kiloampere range. Since the restrike current occurring does not disappear until one or two half cycles of the driving voltage have passed, that is to say not until up to 20 ms, this varistor arrangement can be loaded during restriking with an unacceptably high level of energy, of several MJ.

Figure 4:
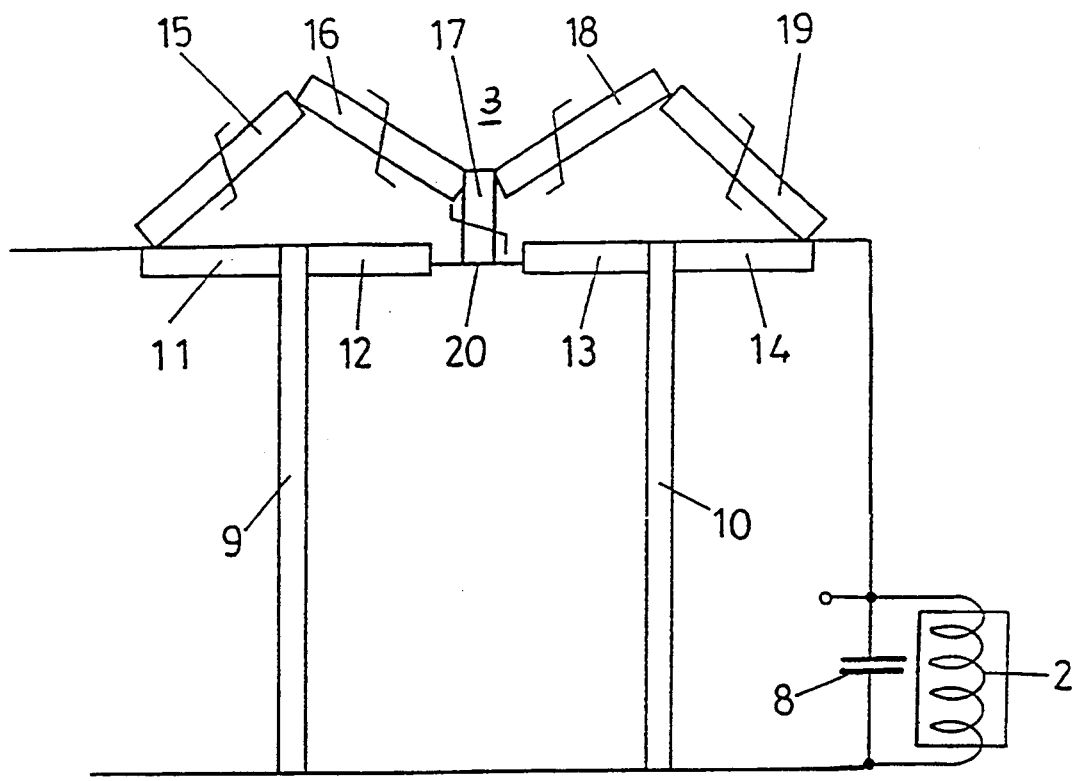
FIG. 4 shows a schematic view of a switch pole of a second embodiment of the reactor switch according to the invention which is arranged in the high-voltage network according to FIG. 1 instead of the reactor switch according to the prior art.

The reactor switch according to the invention can also be designed as shown in FIG. 4. In this case, the third varistor 17 is arranged symmetrically with respect to the first 15, 16 and second varistors 18, 19, and this varistor is held between the first 11, 12 and second switching chambers 13, 14 on the one hand by the varistors 16 and 18 and on the other hand by the current connection 20. In the case of this arrangement, as also in the case of the arrangement according to FIG. 2, the first 15, 16 and the second varistor 18, 19 can have an identical residual voltage, and the third varistor 17, can have a residual voltage which is to a greater or lesser extent less than that of the first and second varistors, depending on the dimensioning.

Figure 5:
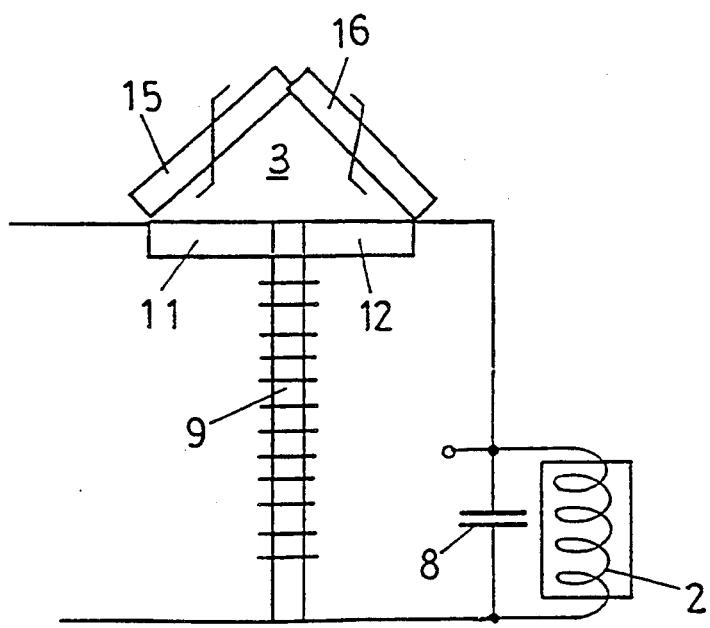
FIG. 5 shows a schematic view of a switch pole of a third embodiment of the reactor switch according to the invention which is arranged in the high-voltage network according to FIG. 1 instead of the reactor switch according to the prior art.

In its simplest embodiment, the reactor switch according to the invention contains a network in which one switch pole—as is shown in the case of the insulator column 9 according to FIG. 5—comprises two series-connected switching chambers 11 and 12, which are mounted on the insulator column 9, as well as two series-connected varistors 15, 16, which bridge the series connection of the two switching chambers 11, 12.

As a modification of the invention, it is also possible to provide a network having more than four, for example five or six, switching chambers and more than five varistors.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letter patent of the United States is:

1. A reactor switch for switching a reactor on and off, wherein the reactor is arranged in a multi-phase electrical high-voltage network, the reactor switch including switch poles which are provided phase-by-phase between the reactor and a part of the network, each of the switch poles having at least four series-connected switching chambers and five varistors including two series connected first varistors, two series-connected second varistors and a third varistor, the at least four series-connected switching chambers including two series-connected first switching chambers mounted on a first insulator column and two series-connected second switching chambers mounted on a second insulator column, and a series connection between said first and second switching chambers, said two first switching chambers being bridged by said two first varistors and said third varistor, said two second switching chambers being bridged by said two second varistors and said third varistor, the third varistor being connected at one end thereof to a current connection between the first and the second switching chambers and at another end thereof to a current connection between the first and the second varistors.

2. The reactor switch as claimed in claim 1, wherein the varistors are supported on auxiliary insulators, which are mounted on the insulator columns.

3. The reactor switch as claimed in claim 2, wherein the first and second varistors are dimensioned in such a manner that, in the event of a restrike of the two first and of the two second switching chambers, the gradient of the restrike transients is constrained by limiting the recovery voltage to a value which is compatible with the electrical insulation of the reactor.

4. The reactor switch as claimed in claim 2, wherein the two first varistors and the third varistor are arranged on the first insulator column, and the two second varistors are arranged on the second insulator column.

5. The reactor switch as claimed in claim 4, wherein the first and second varistors are dimensioned in such a manner that, in the event of a restrike of the two first and the two second switching chambers, the gradient of the restrike transients is constrained by limiting the recovery voltage to a value which is compatible with the electrical insulation of the reactor.

6. The reactor switch as claimed in claim 4, wherein the third varistor is arranged symmetrically with respect to the first and second varistors and is connected between an electrical node common to one of the first varistors and one of the second varistors and the series connection between the first and second switching chambers.

7. The reactor switch as claimed in claim 6, wherein the first and second varistors are dimensioned in such a manner that, in the event of a restrike of the two first and of the two second switching chambers, the gradient of the restrike transients is constrained by limiting the recovery voltage to a value which is compatible with the electrical insulation of the reactor.

8. The reactor switch as claimed in claim 1, wherein the first and second varistors are dimensioned in such a manner that, in the event of a restrike of the two first and of the two second switching chambers, the gradient of the restrike transients is constrained by limiting the recovery voltage to a value which is compatible with the electrical insulation of the reactor.

9. The reactor switch as claimed in claim 8, wherein the varistors are of identical construction.

10. A reactor switch for switching a reactor on and off, wherein the reactor is arranged in a multi-phase electrical high-voltage network, the reactor switch including switch poles which are provided phase-by-phase between the reactor and a part of the network, each of the switch poles having at least two series-connected switching chambers and at least two series-connected varistors connected directly in parallel across the at least two series-connected switches chambers, the two series-connected switching chambers being mounted on an insulator column and the two series-connected switching chambers being directly bridged by the at least two series-connected varistors.

* * * * *

UNITED STATES PATENT AND TRADEMARK OFFICE
CERTIFICATE OF CORRECTION

PATENT NO. : 5,353,186
DATED : October 4, 1994
INVENTOR(S) : Ruoss et al.

It is certified that error appears in the above-indentified patent and that said Letters Patent is hereby corrected as shown below:

On the title page of the above-identified patent, between items [76] and [21], please insert --[73] Assignee: Asea Brown Boveri, Ltd., Baden, Switzerland--.

Signed and Sealed this

Twenty-fourth Day of January, 1995

Attest:

BRUCE LEHMAN

*Attesting Officer*    *Commissioner of Patents and Trademarks*